(12) United States Patent
Larson et al.

(10) Patent No.: US 7,686,555 B1
(45) Date of Patent: Mar. 30, 2010

(54) WEDGE BASED FASTENER

(75) Inventors: Nils E. Larson, San Jose, CA (US); Michael K. Liebman, Sunnyvale, CA (US); Jonathan M. Garbarino, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 307 days.

(21) Appl. No.: 11/703,003

(22) Filed: Feb. 6, 2007

(51) Int. Cl.
*F16B 33/00* (2006.01)

(52) U.S. Cl. .................. 411/367; 411/349; 411/354; 453/607; 453/608

(58) Field of Classification Search .................. 411/15, 411/44, 57.1, 58, 63, 75, 337, 349, 354, 367, 411/80.5, 80.6, 61, 69, 351, 479; 24/453, 24/607, 608; 403/365, 367, 371, 372; 453/607, 453/608
See application file for complete search history.

(56) References Cited

U.S. PATENT DOCUMENTS

| | | | | |
|---|---|---|---|---|
| 1,835,243 A * | 12/1931 | Schaffert | ................ | 403/410 |
| 2,060,970 A * | 11/1936 | Belden | ................ | 16/404 |
| 2,368,713 A * | 2/1945 | Kane | ................ | 411/552 |
| 2,499,315 A * | 2/1950 | Johnson | ................ | 411/360 |
| 3,076,668 A * | 2/1963 | Famely | ................ | 285/137.11 |
| 3,117,484 A * | 1/1964 | Myers | ................ | 411/348 |
| 3,202,034 A * | 8/1965 | Korenchan | ................ | 411/24 |
| 3,217,586 A * | 11/1965 | Jaworski | ................ | 411/80.6 |
| 3,273,444 A * | 9/1966 | Houvener et al. | ................ | 411/75 |
| 3,298,725 A * | 1/1967 | Boteler | ................ | 403/282 |
| 3,373,648 A * | 3/1968 | Pitzer | ................ | 411/24 |
| 3,515,418 A * | 6/1970 | Nielsen Jr. | ................ | 403/109.5 |
| 3,550,244 A * | 12/1970 | Utzy et al. | ................ | 29/407.05 |
| 3,603,626 A * | 9/1971 | Whiteside | ................ | 403/408.1 |
| 3,770,036 A | 11/1973 | Sherman | | |
| 3,913,444 A * | 10/1975 | Otte | ................ | 411/479 |
| 4,029,426 A | 6/1977 | Sims, Jr. | | |
| 4,243,339 A * | 1/1981 | Dickerson | ................ | 403/4 |
| 4,338,736 A * | 7/1982 | Radigan | ................ | 37/458 |
| 4,482,277 A * | 11/1984 | Schiefer | ................ | 411/42 |
| 4,508,467 A | 4/1985 | Choffin | | |
| 4,602,902 A * | 7/1986 | Herb | ................ | 411/45 |
| 4,610,589 A * | 9/1986 | Bredal | ................ | 411/180 |
| 4,790,683 A | 12/1988 | Cramer, Jr. et al. | | |
| 5,104,141 A * | 4/1992 | Grove et al. | ................ | 280/86.753 |
| 5,170,551 A * | 12/1992 | Norberg | ................ | 29/523 |
| 5,234,300 A * | 8/1993 | Fluckiger | ................ | 411/383 |
| 5,284,409 A * | 2/1994 | Miyanaga | ................ | 411/55 |
| 5,356,252 A * | 10/1994 | Whistler et al. | ................ | 411/45 |
| 5,413,441 A * | 5/1995 | Heminger et al. | ................ | 411/55 |
| 5,539,597 A | 7/1996 | Blanks | | |
| 5,568,675 A * | 10/1996 | Asami et al. | ................ | 24/453 |

(Continued)

*Primary Examiner*—Victor Batson
*Assistant Examiner*—Roberta Delisle

(57) ABSTRACT

A fastener that includes a shaft and a sleeve is provided. The shaft extends along a longitudinal axis that passes through a central portion, e.g., the centroid of a head of the shaft. The sleeve is wrapped partially around the shaft. The sleeve has a gap that separates first and second circumferential extents thereof, a first thickness adjacent the first circumferential extent, and a second thickness between the second circumferential extent and the first circumferential extent. The first thickness is less than the second thickness. The sleeve has a first rotational position relative to the shaft and a second rotational position relative to the shaft different form the first rotational position. The longitudinal axis is in substantially the same location in both the first and second rotational positions.

3 Claims, 13 Drawing Sheets

U.S. PATENT DOCUMENTS

| | | |
|---|---|---|
| 5,761,006 A | 6/1998 | Sri-Jayantha et al. |
| 5,779,260 A * | 7/1998 | Reilly et al. .......... 280/86.754 |
| 5,828,521 A | 10/1998 | Hasegawa |
| 5,867,348 A | 2/1999 | Suwa |
| 5,894,382 A | 4/1999 | Hyde |
| 5,907,890 A * | 6/1999 | Redaelli .................... 16/96 R |
| 5,919,018 A | 7/1999 | Chuang |
| 5,999,373 A | 12/1999 | Allsup et al. |
| 6,018,441 A | 1/2000 | Wu et al. |
| 6,053,655 A | 4/2000 | Mazhar |
| 6,128,165 A | 10/2000 | Baker et al. |
| 6,288,879 B1 | 9/2001 | Misso et al. |
| 6,333,839 B1 | 12/2001 | Misso et al. |
| 6,480,363 B1 | 11/2002 | Prater |
| 6,519,116 B1 | 2/2003 | Lin et al. |
| 6,655,847 B2 | 12/2003 | Obara et al. |
| 6,754,046 B2 | 6/2004 | Barina et al. |
| 6,856,491 B1 | 2/2005 | Oveyssi |
| 6,856,492 B2 | 2/2005 | Oveyssi |
| 6,925,715 B2 | 8/2005 | Ramsdell |
| 6,991,413 B2 * | 1/2006 | Ballou et al. ................. 411/15 |
| 6,997,658 B2 | 2/2006 | Fly |
| 7,085,108 B1 | 8/2006 | Oveyssi et al. |
| 7,633,722 B1 | 12/2009 | Larson et al. |
| 2002/0003993 A1 * | 1/2002 | Ichimaru .................... 411/325 |
| 2002/0101688 A1 | 8/2002 | Liu et al. |
| 2002/0118490 A1 | 8/2002 | Macpherson et al. |
| 2002/0131844 A1 * | 9/2002 | Kefes ........................ 411/418 |
| 2003/0053260 A1 | 3/2003 | Barina et al. |
| 2004/0095683 A1 | 5/2004 | Dominguez, Jr. et al. |
| 2004/0170484 A1 * | 9/2004 | Pourtier .................... 411/57.1 |
| 2005/0152766 A1 * | 7/2005 | Ballou et al. ............... 411/57.1 |

* cited by examiner

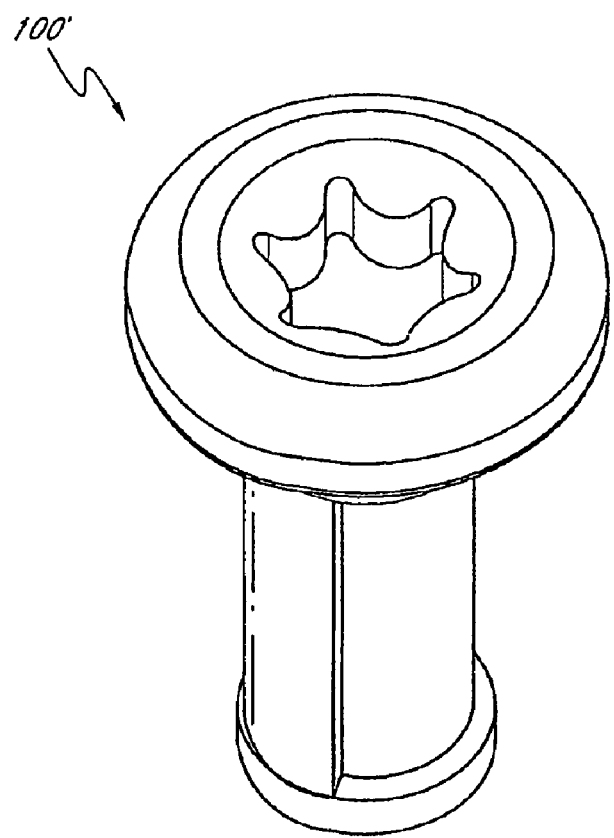
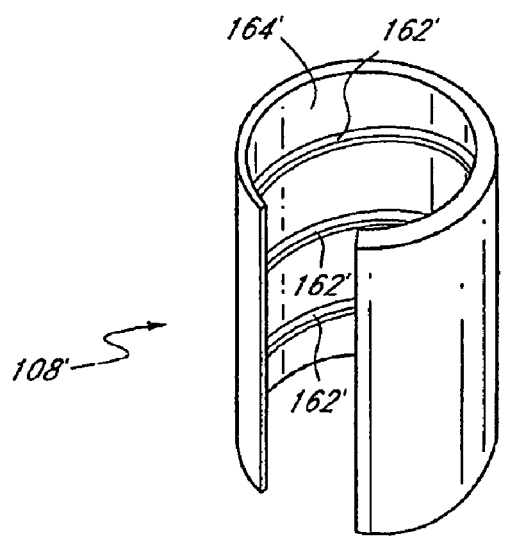
FIG. 4

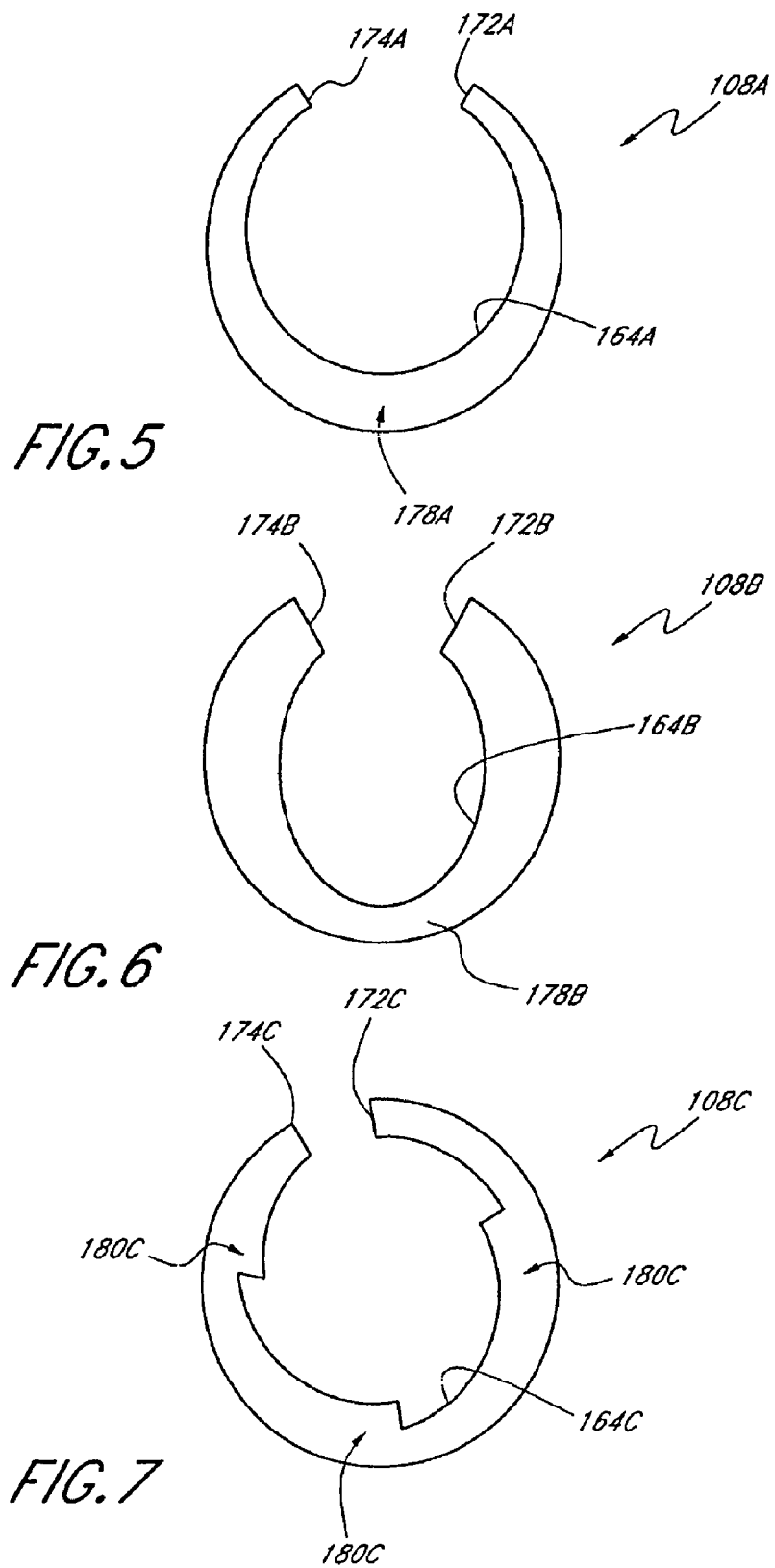

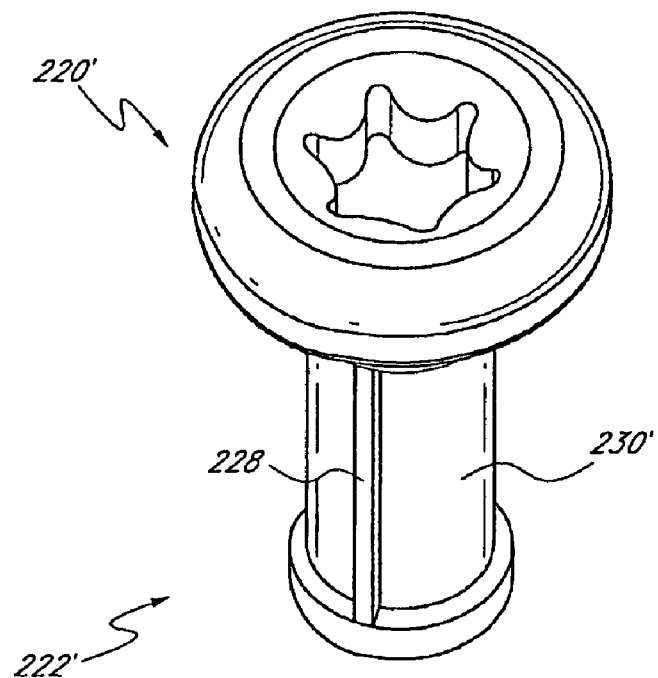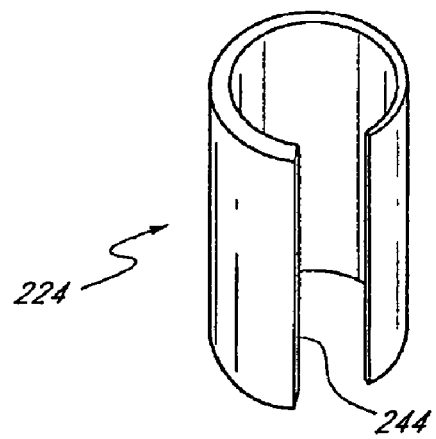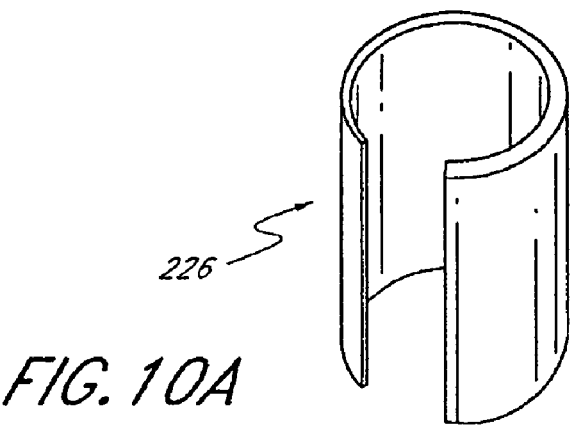
FIG. 10A

US 7,686,555 B1

WEDGE BASED FASTENER

BACKGROUND OF THE INVENTION

1. Field of the Invention

This application relates to fasteners that can be used to couple structures together, which fasteners can include a sleeve wrapped partially around a shaft.

2. Description of the Related Art

A variety of fasteners have been used to couple two components together. For example, screws and adhesives have been used in disk drives to connect a cover to a base. Although screws can be used to connect a cover and a base of a disk drive together they have several disadvantages. For example, screws take significant time to install because they generally require many revolutions to engage a first set of threads with a second set of threads. Sufficient engagement of mating threads can require three or more revolutions of the screw. In high-volume manufacturing, where assembly time should be minimized, this procedure can take too much assembly time, especially where several screws are used to connect the cover and base of a disk drive. Also, coupling using mating metal screw threads is a process that can generate small metal particles that can interfere with the operation of the disk drive if such particles are introduced into the inside of the drive.

SUMMARY

In one aspect, a fastener is provided that includes a shaft and a sleeve. The shaft extends along a longitudinal axis that passes through a cross-sectional centroid of the shaft. The sleeve is wrapped partially around the shaft. The sleeve comprises an inner surface adjacent the shaft, an outer surface, an upper extent, and a lower extent. The sleeve also comprises a first circumferential extent, a second circumferential extent, and a gap. The gap extends longitudinally from the upper extent to the lower extent and separates the first circumferential extent from the second circumferential extent. The sleeve has a first thickness adjacent the first circumferential extent and a second thickness between the second circumferential extent and the first circumferential extent. The first thickness is less than the second thickness. The sleeve has a first rotational position relative to the shaft and a second rotational position relative to the shaft different form the first rotational position. The longitudinal axis is in substantially the same location in both the first and second rotational positions.

BRIEF DESCRIPTION OF THE DRAWINGS

FIG. 4 is an exploded top perspective view of another embodiment of a fastener in which ribs are formed on a sleeve.

FIG. 5 is a top plan view of another embodiment of a sleeve that can be used with a fastener similar to the fastener of FIG. 1.

FIG. 6 is a top plan view of another embodiment of a sleeve that can be used with a fastener similar to the fastener of FIG. 1.

FIG. 7 is a top plan view of another embodiment of a sleeve that can be used with a fastener similar to the fastener of FIG. 1.

FIG. 10A is an exploded top perspective view of another embodiment of a fastener that includes two sleeves.

DETAILED DESCRIPTION OF THE PREFERRED EMBODIMENTS

As discussed above, this application is directed to inventive fasteners. In various embodiments, the fasteners include one or more wedge-like members, which can be configured as a sleeve. These wedge-like members can be wrapped partially around a shaft of the fastener. Although the fasteners described herein are generally applicable, e.g., in environments where minimizing particle generation or assembly time is desirable, one non-limiting environment in which the fastener can be used is a disk drive. Another suitable environment is a computer or other user device in which the fasteners described herein can be used to secure components, such as a disk drive, to a rail, flange, or other mounting structure.

Figure 1:
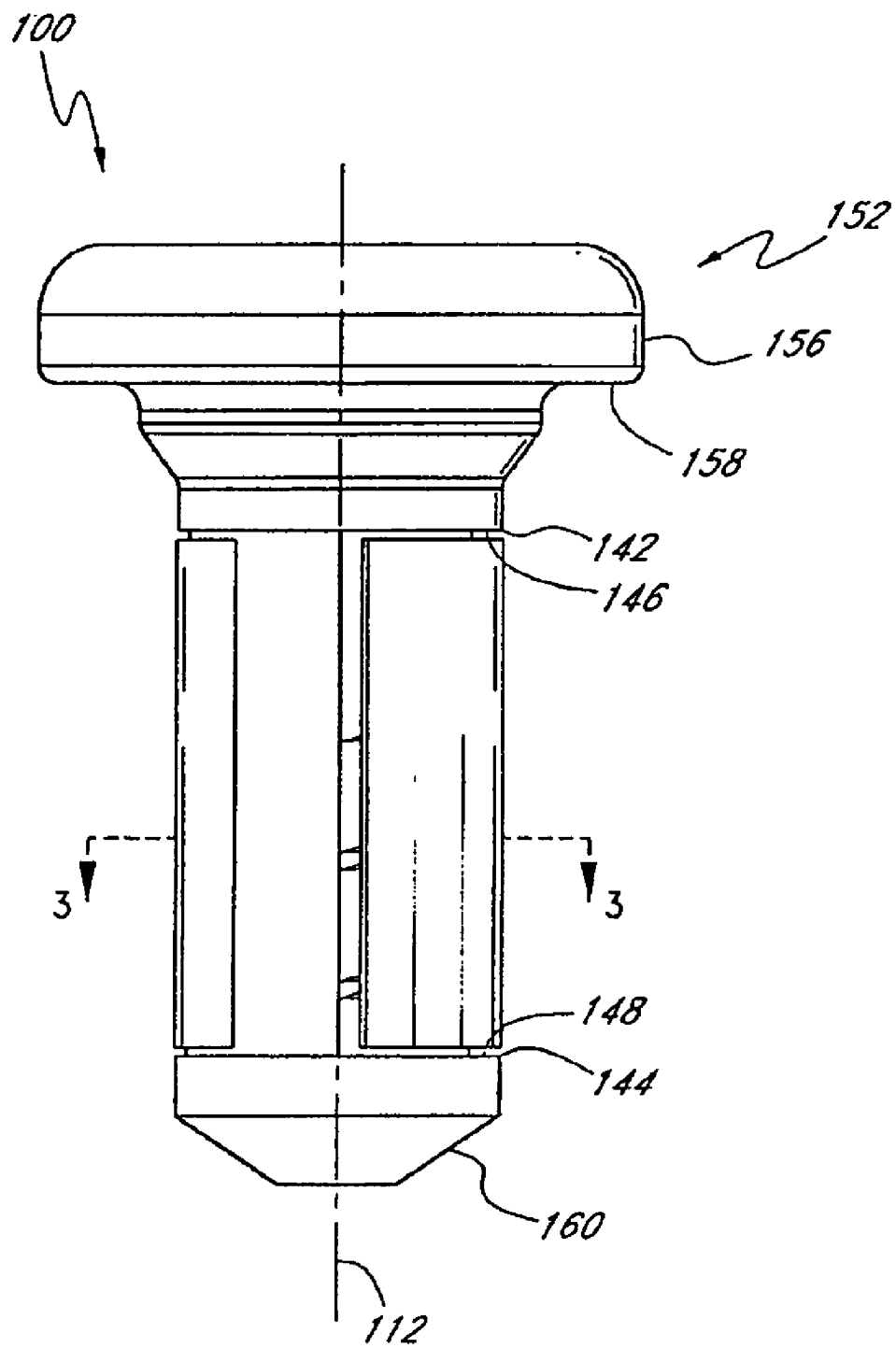
FIG. 1 is a side view of a fastener according to one example embodiment.
Figure 2:
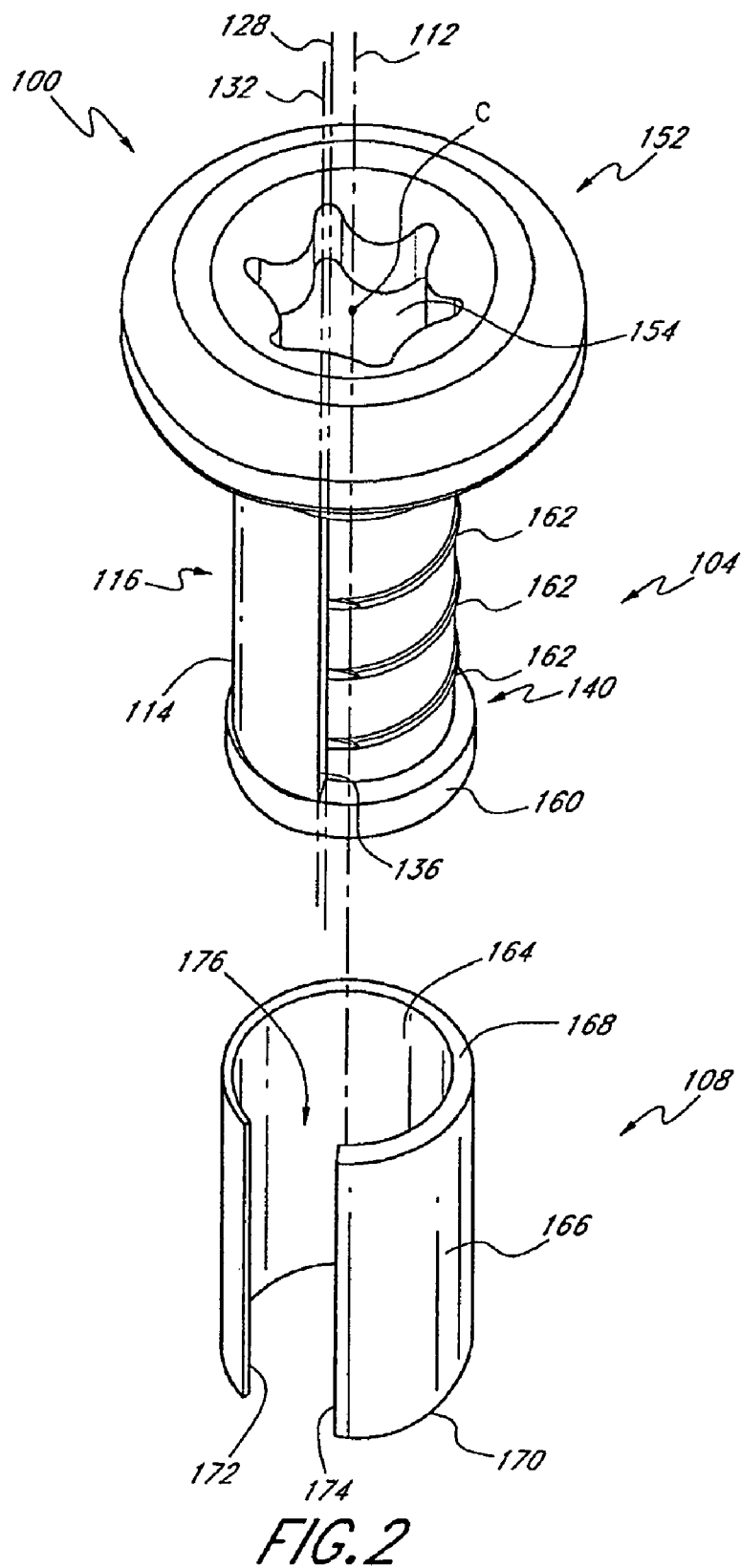
FIG. 2 is an exploded top perspective view of the fastener shown in FIG. 1.
Figure 3:
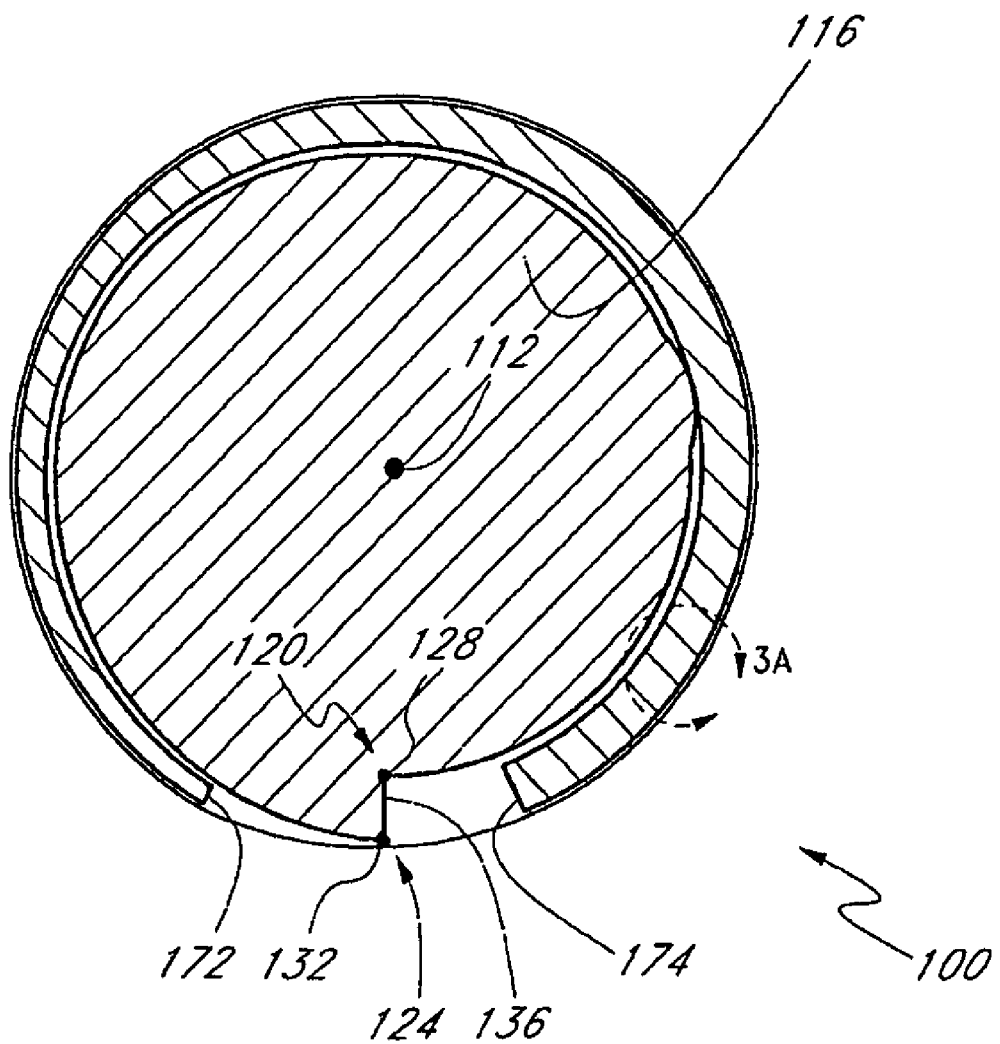
FIG. 3 is a cross-sectional view of a shaft and sleeve of the fastener shown in FIG. 1 taken along section line 3-3.

FIGS. 1-3 illustrate a first example embodiment of a fastener 100 that includes a shaft 104 and a sleeve 108. The shaft 104 and the sleeve 108 may be made of severable suitable materials. For example, the shaft 104 may be made of a metallic material, such as stainless steel, aluminum, or brass, while the sleeve 108 may comprise a suitable polymeric material. A suitable polymeric material may include nylon, polyetherimide (sold by General Electric under the brand name Ultem®), polycarbonate (sold by General Electric under the brand name Lexan®), or acetyl resin (sold by Dupont under the brand name Delrin®). A suitable polymer may also be filled with glass or mineral fillers to improve creep performance. In some applications, the sleeve 108 can be made of a metallic material, such as steel, brass or aluminum.

The shaft 104 extends along a longitudinal axis 112 that passes through a central portion C of the shaft 104. The central portion C of the shaft can be the cross-sectional centroid thereof if the shaft is circular in cross-section. Where the shaft 104 is not circular, e.g., having a raised helical surface, the central portion C can be projection of the centroid of a head portion thereof. In embodiments with non-round shafts, the longitudinal axis can be one that passes through this centroid of a head portion of the fastener. The central portion C includes a point about which the shaft 104 rotates in some embodiments.

As discussed further below, the shaft 104 and the sleeve 108 are moveable relative to each other, e.g., between first and second rotational positions, and such movement enables the fastener 100 to couple two structures or objects together. Preferably, the fastener 100 is arranged such that the location of the longitudinal axis 112 remains substantially the same in at least two different rotation positions of the shaft 104 and the sleeve 108.

In one embodiment, the shaft 104 comprises a shaft outside surface 114 that includes a raised helix 116, which can be seen in the transverse cross-section of FIG. 3. The raised helix 116 can extend from a first end 120 to a second end 124. In one embodiment, the helix 116 can form a portion of a helical surface that extends from a first generally longitudinal axis 128 extending through the first end 120 to a second generally longitudinal axis 132 extending through the second end 124. A shoulder 136 can extend form the first end 120 to the second end 124 of the raised helix 116. In one embodiment, the shoulder 136 extends generally radially between the first longitudinal axis 128 and the second longitudinal axis 132. In one embodiment, the shoulder 136 extends from the first longitudinal axis 128 to the second longitudinal axis 132. The first and second longitudinal axes 124, 128 can extend generally parallel to the longitudinal axis 112. In one embodiment, the shoulder 136 is a generally planar surface. The shoulder 136 can extend generally axially generally parallel to the longitudinal axis 112.

With continued reference to FIGS. 1-3, the shaft 104 can include a recess 140 into which the sleeve 108 can extend. The recess 140 can be defined by an upper end 142, a lower end 144, and an outer surface of the raised helix 116. The recess 140 is further bounded in one embodiment by an upper shoulder 146 and a lower shoulder 148. Where the raised helix 116 is provided, the thickness of at least one of the shoulders 146, 148 gradually decreases between the first and second ends 124, 128 of the helix 116. The recess 140 is configured to receive the sleeve 108 when the sleeve 108 is coupled with, e.g., wrapped partially around the shaft 104. Preferably, the recess 140 extends along the longitudinal axis 112. In one embodiment, the recess extends over a substantial length of the shaft 104 of the fastener 100.

With reference to FIGS. 1 and 2, the shaft 104 further comprises a head portion 152. Preferably, the head portion 152 comprises a diameter that is larger than the diameter of the shaft 104. In one embodiment, the head portion 152 includes a tool recess 154 that can receive a tool that is able to rotate the fastener 100. The tool recess 154 may comprise any suitable shape to mate with a tool for rotating the fastener 100. Such a shape may comprise, for example, a Phillips™, a flat, a Torx™ (hexalobular), or a hex-shaped recess. In other embodiments, the head portion 152 includes an external surface or surfaces that can be engaged externally, e.g., by a socket wrench or similar external drive tool. The head portion 152 further defines a flange 156 in one embodiment that comprises a lower shoulder 158. The lower shoulder 158 preferably facilitates securing one structure to another, such as a disk drive cover to a disk drive base, when the fastener 100 is used. FIG. 1 shows that the longitudinal axis 112 extends through the centroid of the head portion 152.

FIGS. 1 and 2 also show that the lower portion of the shaft 104 can include a conical tip 160. The conical tip 160 extends downward from the lower shoulder 148 of the shaft portion 104 in one embodiment. The conical tip 160 can be configured to assist in locating the fastener 100 into a hole or recess when the fastener is to be secured to a structure. Although the embodiment shown in FIGS. 1 and 2 includes a conical tip 160, any suitable tip shape, including a blunt shape, would also be suitable.

FIGS. 1-3 show that the shaft 104 can include a plurality of ribs 162, which in the illustrated embodiment wrap around a substantial portion of the raised helix 116. The ribs 162 and the variations thereof described herein reduce relative motion between the shaft 104 and the sleeve 108. The ribs 162 are one means for minimizing relative motion between the shaft 104 and the sleeve 108 along the longitudinal axis 112, which, as described further below, can be disposed on the shaft 104 or the sleeve 108.

In this embodiment, the shaft 104 includes three ribs 162. In one embodiment, the ribs 162 begin near the first end 120 of the raised helix 116 and extend around the raised helix 116 towards the second end 124. As the ribs 162 extend around the raised helix 116, the ribs preferably extend upwards along the shaft 104 so as to provide a pitch angle therebetween. Any suitable pitch angle can be provided on the ribs 162, such as, for example, approximately five degrees. Although the ribs 162 of the fastener 100 comprise a pitch angle of approximately five degrees, any other suitable pitch angle, including a pitch angle of zero degrees, and other numbers of ribs 162 may be employed. In one modified embodiment, the shaft includes at least one rib that does not comprise a pitch angle. The at least one rib can extend around the raised helix 116 in a direction substantially perpendicular to the longitudinal axis 112. In one arrangement, substantially all points of a central portion of the at least one rib can be located a substantially constant longitudinal distance from the flange 156. In another modified embodiment, the shaft 104 is provided with one or more ribs that have little or no pitch angle and one or more ribs that have a pitch angle, similar to those described above. By providing at least some of the ribs with a pitch angle, some axial force can be generated from the engagement of the ribs, as discussed further below.

FIGS. 1-3 show that the sleeve 108, which is configured to at least partially surround the shaft 104, can comprise an inner surface 164 and an outer surface 166. The sleeve 108 preferably extends from an upper extent 168 to a lower extent 170. The sleeve 108 also preferably extends circumferentially from a first circumferential extent 172 to a second circumferential extent 174. In one embodiment, the sleeve 108 has a first thickness adjacent the first circumferential extent 172 and a second thickness between the second circumferential extent 174 and the first circumferential extent 172. The first thickness preferably is less than the second thickness. In one embodiment, the second thickness is adjacent to the second circumferential extent 172. In one variation, the sleeve 108 increases in thickness, e.g., continuously, so that the thickness at the second circumferential extent 174 is greater than the thickness of the sleeve at the first circumferential extent 172.

Figure 3A:
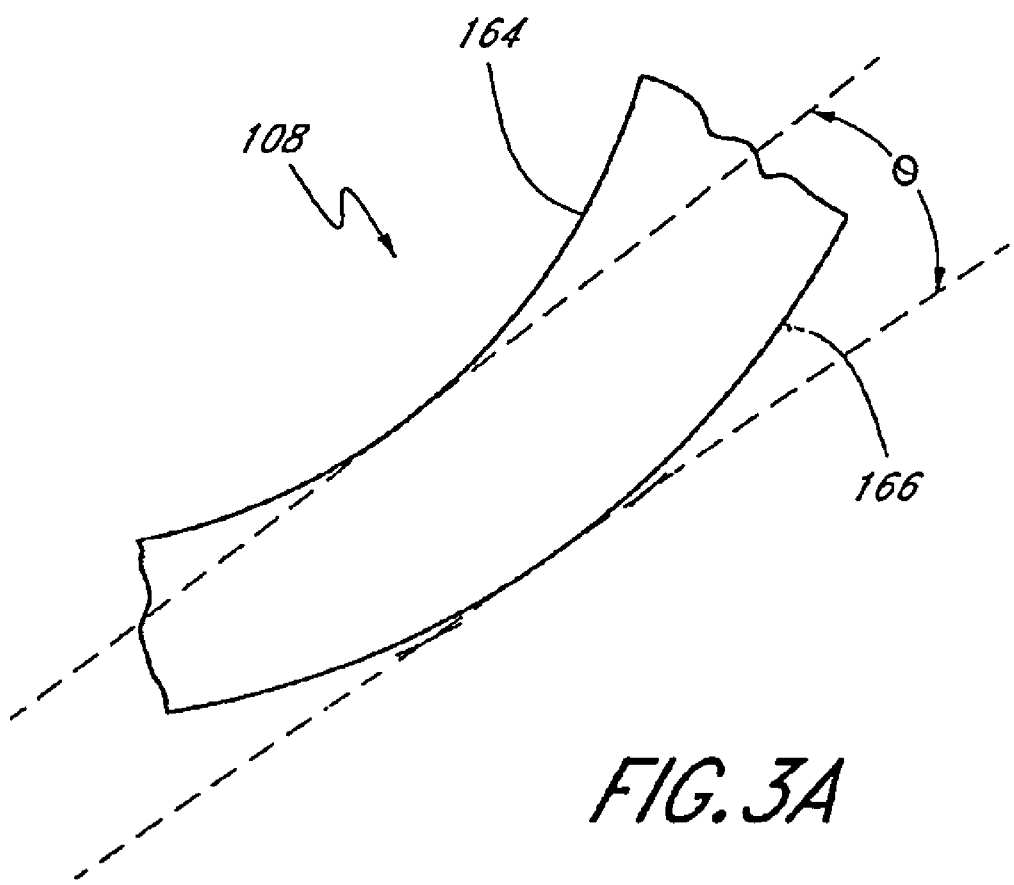
FIG. 3A is an enlarged view of the sleeve shown in the cross-sectional view of FIG. 3.

In one embodiment, the increase in thickness between the first and second circumferential extents 172, 174 provides a wedge-like arrangement. The wedge-like arrangement can comprise an angle between the inside surface and the outside surfaces 164, 166 of about 8 degrees or less. The wedge angle can be defined between a tangent to the inside surface and a tangent to the outside surface as shown by angle θ in FIG. 3A. In one embodiment, the sleeve 108 provides a wedge-like arrangement by increasing in thickness by about 0.3 times the inner diameter or less per radian between the first and second extents 172, 174.

The sleeve 108 further includes a gap 176 defined between the first circumferential extent 172 and the second circumferential extent 174. The gap 176 can extend longitudinally from the upper extent 168 to the lower extent 170 and can separate the first circumferential extent 172 from the second circumferential extent 174. In one embodiment, the gap 176 extends generally parallel to the longitudinal axis 112 of the fastener 100. In one arrangement, the cross-section of the sleeve 108, as shown in FIG. 3, is substantially C-shaped.

The length of the sleeve 108 extending from the upper extent 168 to the lower extent 170 is preferably sized to be slightly shorter than the distance from the upper shoulder 146 to the lower shoulder 148 of the shaft 104. The length of the sleeve 108 is configured so that the sleeve 108 can at least partially reside in the recess 140 defined by the shaft 104. Furthermore, the length of the sleeve 108 is preferably sized so that the sleeve 108 can move axially along the shaft 104.

With continued reference to FIGS. 1-3, the fastener 100 is preferably used in an application in which the fastener 100 is at least partially inserted into a cylindrical hole or recess. When the fastener 100 is inserted into a hole, it can then be rotated to secure the fastener 100 into the hole. Upon rotation of the fastener 100 from a first, unfastened to a second, fastened position, a perimeter coinciding with the outer surface 166 of the sleeve preferably increases in size, thus securing the fastener 100 to the hole.

Before insertion of the fastener 100 into a hole, the sleeve 108 is preferably positioned along the shaft 104 in such a way as the second circumferential extent 174 of the sleeve 108 is positioned adjacent to the shoulder 136 of the shaft 104. Furthermore, the sleeve 108 resides at least partially in the recess 140 defined by the shaft 104. Upon insertion of the fastener 100 into a hole, the outer surface 166 of the sleeve 108 preferably comes into frictional contact with the side wall of the hole. At this time, the shaft 104 can be rotated, e.g., in a clockwise direction, about a longitudinal axis 112 of the fastener 100, thus rotating the shaft 104 clockwise relative to both the hole and the sleeve 108. This motion preferably coincides with a frictional engagement of the sleeve 108 with the hole into which the fastener 100 is inserted. As the shaft 104 rotates clockwise relative to both the sleeve 108 and the hole, the surface of the helix 116 preferably slides along the inner surface 164 of the sleeve 108. Furthermore, as the shaft 104 rotates in a clockwise direction. The shoulder 136 of the shaft 104 is moved away from the second circumferential extent 174 of the sleeve 108. This movement expands the sleeve 104 and increases the circumferential perimeter of the sleeve 108. This engagement could be accomplished by a counter-clockwise motion in some embodiments.

As the fastener 100 is rotated to secure the fastener to a hole, the ribs 162 located on a surface of the helix 116 of the shaft 104 preferably engage with the inner surface 164 of the sleeve 108. Engagement of the ribs 162 with the inner surface of the sleeve 164 can minimize axial motion of the shaft 104 relative to the sleeve 108. Furthermore, where a pitch angle is provided for the ribs 162, the fastener 100 can be tightened axially onto a work piece, e.g., by moving the shaft 104 axially downwards relative to the sleeve 108 and work piece.

FIG. 4 shows a fastener 100' that is similar to the fastener 100 except for certain differences such as those that are described below. In the fastener 100', a plurality of ribs 162' is located on an inner surface 164' of a sleeve 108'. The ribs 162' can have any of the configurations described above in connection with the ribs 162 and can have a substantially similar effect as was described above in connection with the ribs 162. For example, the ribs 162' can comprise a pitch angle of approximately five degrees. The pitch angle of the ribs 162' can comprise any suitable other pitch angle, including an angle of zero degrees. Furthermore, any number of ribs, including one, up to and including three, or more than three, may be employed.

FIGS. 5-7 illustrate other example embodiments of sleeve 108. FIG. 5 is one alternate embodiment of a sleeve 108A in which the thickness of the sleeve 108 increases from a first circumferential extent 172A and continues to thicken to a central portion 178A. In one embodiment, the central portion 178A is approximately circumferentially opposite the first circumferential extent 172A. From the central portion 178A toward a second circumferential extent 174A of the sleeve 108A, the thickness of the sleeve decreases in thickness. In one embodiment, the thickness proximate the second circumferential extent 174A is approximately equal to the thickness of the sleeve 108A at the first circumferential extent 172A.

FIG. 6 shows another embodiment of a sleeve 108B. The sleeve 108B extends from a first circumferential extent 172B to a second circumferential extent 174B. The thickness of the sleeve 108B is relatively thick adjacent to the first circumferential extent 172B and becomes thinner toward a central portion 178B. In one variation the central portion 178B is approximately opposite the first circumferential extent 172B. The thickness of the sleeve 108B can increase from the central portion 178B toward the second circumferential extent 174B. In one variation the thickness of the sleeve proximate the first circumferential extent 172B is approximately equal to the thickness thereof proximate the second circumferential extent 174B.

FIG. 7 illustrates another embodiment of a sleeve 108C. The sleeve 108C extends from a first circumferential extent 172C to a second circumferential extent 174C. The sleeve 108C increases and decreases in thickness multiple times along the circumference of the sleeve 108C. The thickness of the sleeve 108C preferably decreases continuously from the first circumferential extent 172C to a position at which a step change 180C occurs. The step change 180C provides a discontinuous increase in the thickness of the sleeve 108C. From the step change 180C, the thickness of the sleeve 108C again decreases to another step change 180C farther around the circumference of the sleeve 108C to another step change 180C. In one embodiment, this pattern continues around the circumference of the sleeve 108C to a second circumferential extent 174C thereof. That is, the thickness of the sleeve 108C includes a plurality of, e.g., three, step changes 180C throughout the circumference of the sleeve 108C. Preferably, the step changes 180C are generally positioned at regular intervals, e.g., at three substantially equally spaced locations around the circumference of the sleeve 108C.

With reference to FIGS. 5-7, a corresponding surface can be provided on the shaft of a fastener intended to mate with one of the sleeves 108A-108C. More particularly, the shaft of a corresponding fastener can include a corresponding mating surface which closely coincides to an inner surface of one of the sleeves 108A-108C. Similar in function to the sleeve 108, the sleeves 108A-C preferably increase in a circumferential dimension as a shaft is rotated relative to the sleeves 108A-C.

The sleeves 108A-C operate slightly differently than the sleeves 108 of FIGS. 1-3 and FIG. 7. When the shaft of a fastener incorporating the sleeves 108A or 108B is moved relative to these sleeves, the circumferential distance or perimeter around the sleeves 108A or 108B preferably increases when a shaft of a fastener with which these sleeves is associated is rotated in either a clockwise direction or a counterclockwise direction. In the embodiment of the sleeve 108 and 108C, the circumferential distance or perimeter around these sleeves preferably increases when a shaft of a fastener with which these sleeves is associated is rotated in only one direction, e.g., in a clockwise direction.

The sleeves 108A-108C function differently than the sleeve 108 in that in use the sleeves 108A-108C generally increase in a circumferential dimension at a greater rate as compared to the sleeve 108. For example, the circumferential distance around the sleeves 108A-108C increase more per amount of rotation of a shaft with which they are associated compared to the increase in circumferential distance around the sleeve 108, if the thickest portion of the sleeve 108 is approximately equal to the thickest portion of the sleeves 108A-108C.

One possible advantage of the sleeve 108 over the sleeves 108A-108C is that larger manufacturing tolerances may be accommodated in the sleeve 108. Furthermore, the fastener 100 may tighten more securely into a hole as compared to a fastener incorporating the sleeves 108A-108C. More secure tightening can be provided because the circumferential distance around the sleeve 108 can increase more slowly per unit of rotation of the shaft 104 compared to that of the sleeves 108A-108C. Also, more secure tightening can be provided because the angle between the inner and outer surfaces of the sleeve 108 may be smaller than the angle defined by the corresponding surfaces on the sleeves 108A-108C.

Figure 8:
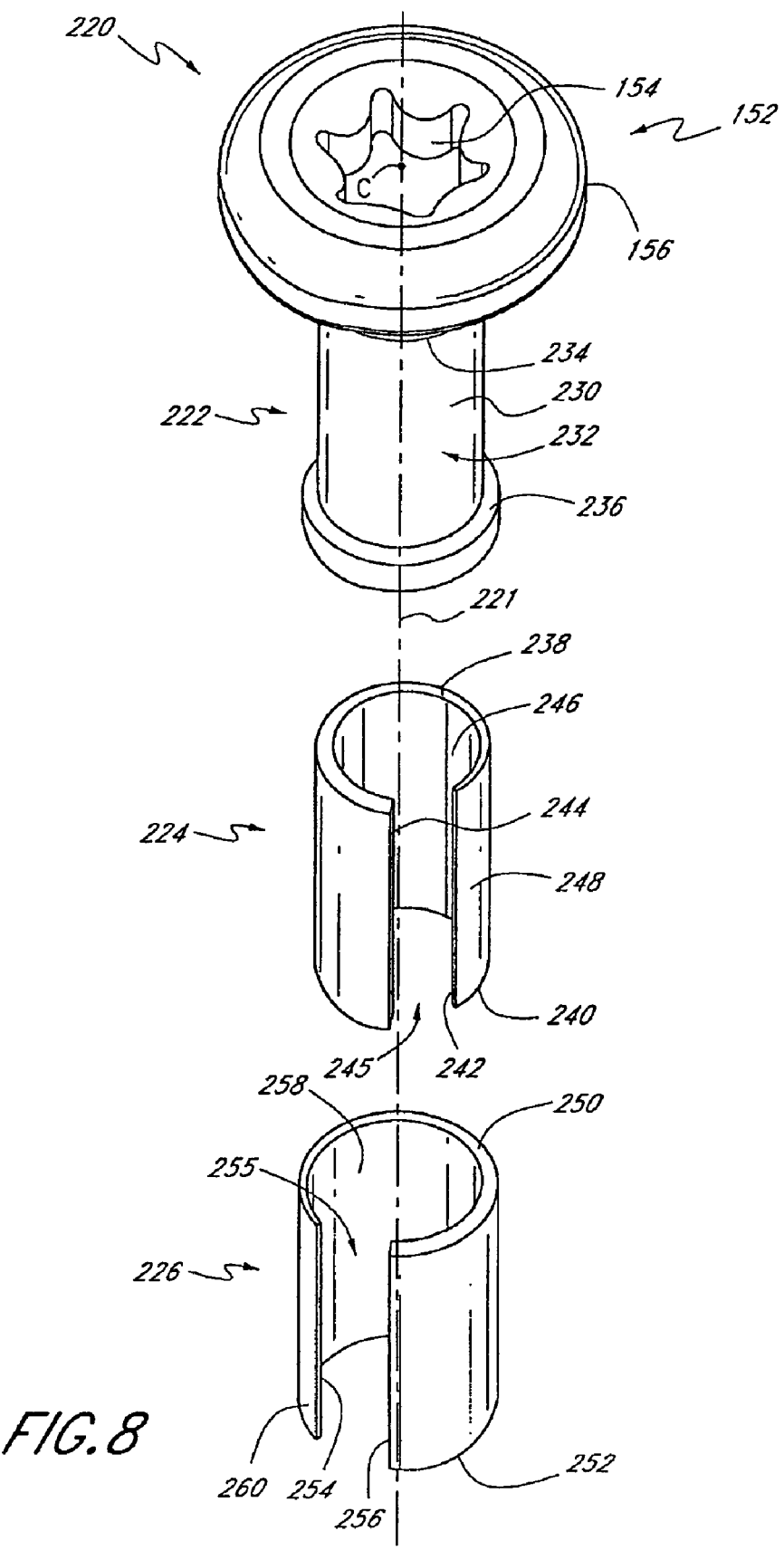
FIG. 8 is an exploded top perspective view of another embodiment of a fastener that includes two sleeves.
Figure 9:
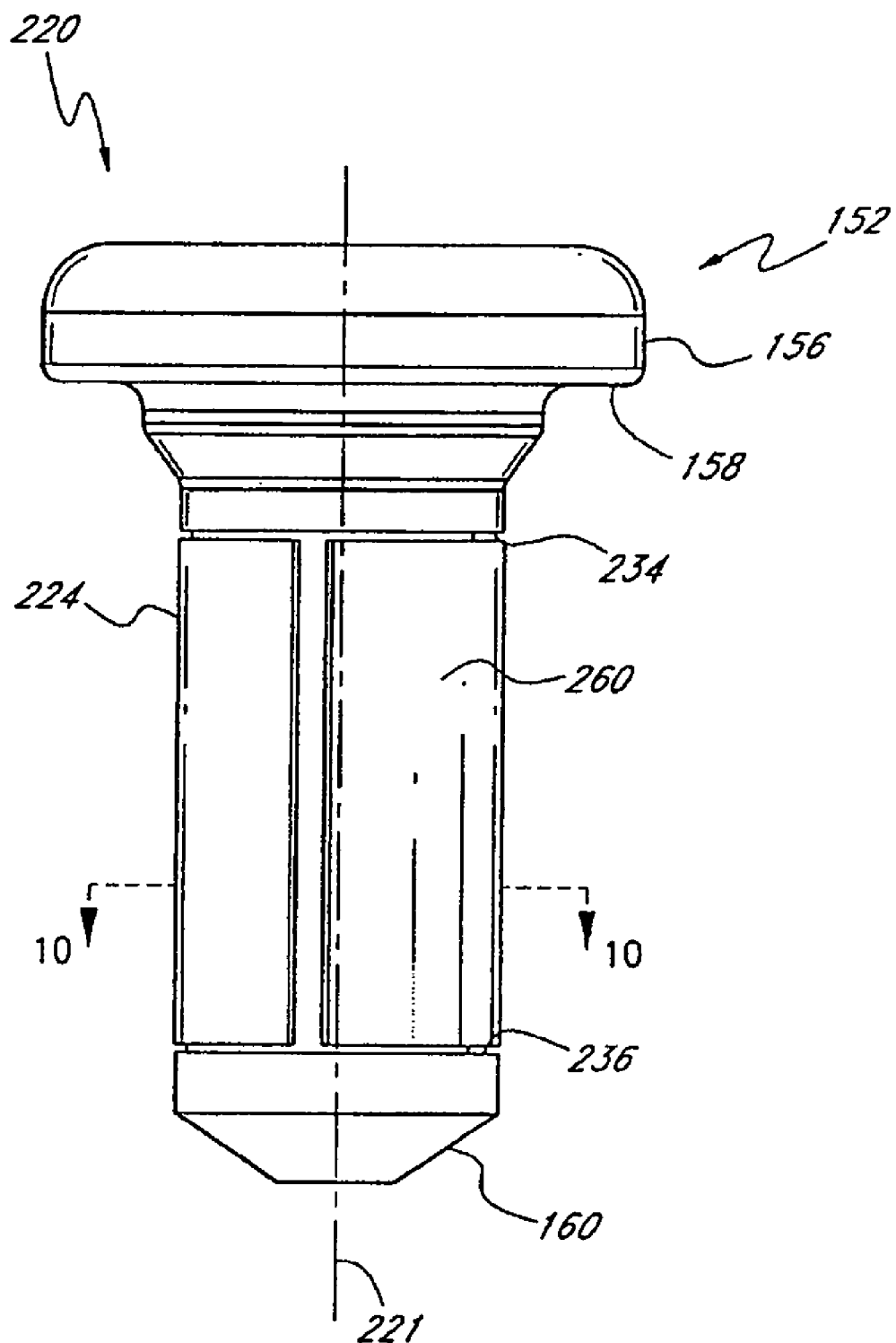
FIG. 9 is a side view of the fastener of FIG. 8.
Figure 10:
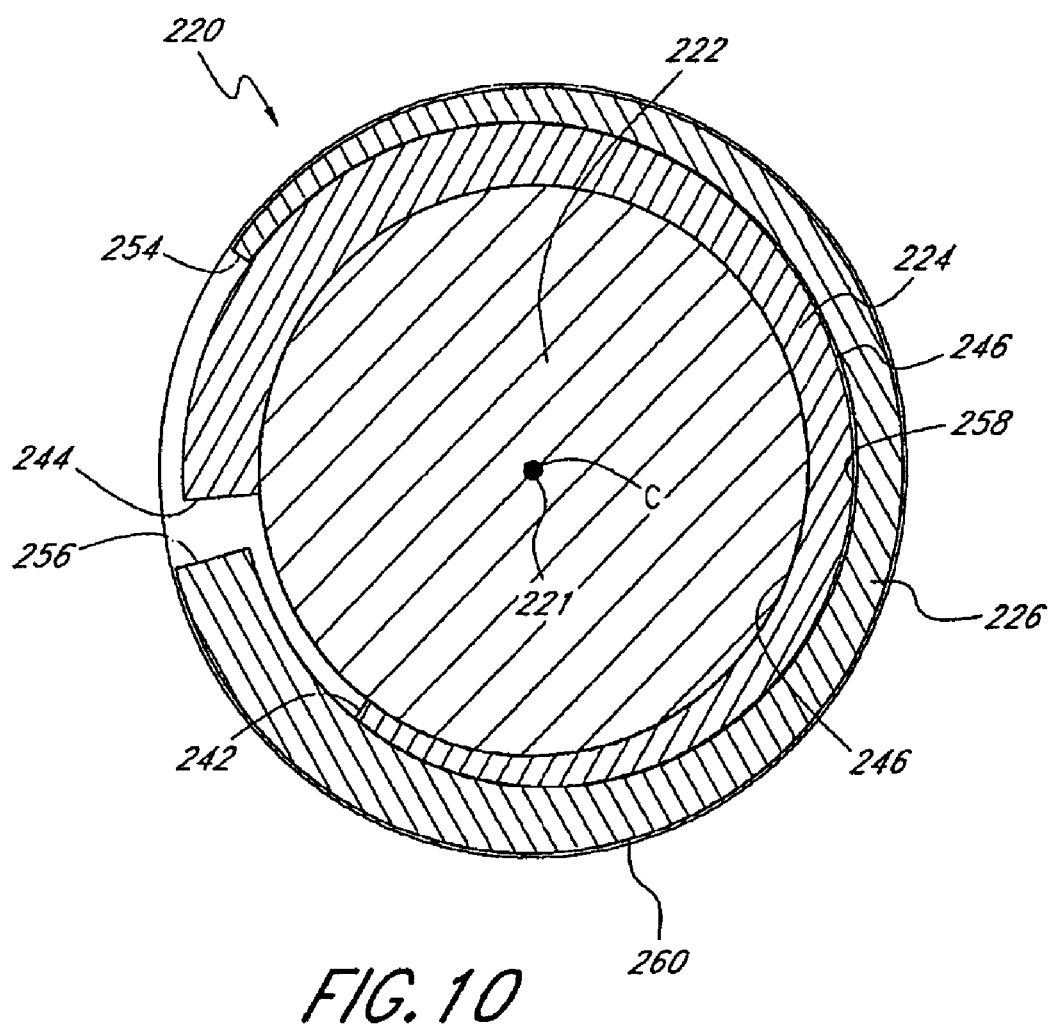
FIG. 10 is a cross-sectional view of the fastener of FIG. 9 taken along section line 10-10.

FIGS. 8-10 illustrate another example embodiment of a wedge-based fastener 220. The fastener 220 includes a shaft 222, an inner sleeve 224, and an outer sleeve 226. The shaft 222 extends along a longitudinal axis 221 that passes through a cross-sectional centroid C of the shaft as shown specifically in FIGS. 8 and 10. As discussed further below, the shaft 222, the inner sleeve 224, and the outer sleeve 226 are movable relative to each other between a first rotational position and a second rotational position. As discussed further below, the first rotational position can correspond to a configuration of the fastener 220 for insertion thereof into a hole or recess and the second rotational position can correspond to, a configuration for engagement of the fastener with an inside surface of the hole or recess. Such movement enables the fastener 220 to couple two structures together. Preferably, the fastener 220 is arranged such that the location of the longitudinal axis 221 remains substantially the same in at least two different rotational positions on the shaft 222 and the sleeve 224 and the sleeve 226. In one embodiment, the longitudinal axis 221 remains in substantially the same position at least in the first and second rotational positions.

Some features of the fastener 220 are similar to those of the fastener 100. For example, the fastener 220 includes a head portion 152 that includes a flange 156, a shoulder 158, and a tool recess 154. As described above, the flange 156 is configured to secure two work pieces or components, such as a cover and a base or a disk drive enclosure and a mounting structure of a user device, together when the fastener 220 is applied thereto.

The shaft 222 comprises a generally circular cross-section, as shown in FIG. 10, and further includes an outer surface 230 that is configured to extend over a substantial length of the shaft 222. The shaft 222 further comprises an upper shoulder 234 and a lower shoulder 236 which are configured to define, in combination with the outer surface 230, a recess 232 which is configured to receive at least one of the inner sleeve 224 and the outer sleeve 226 when the fastener 220 is assembled.

The shaft 222 further comprises a conical tip 160, which is configured to aid in locating the fastener 220 relative to a hole in a work piece. Although a conical tip 160 is shown on the bottom portion of the shaft 222, any suitable end portion can be used including a blunt cylindrical tip.

With continued reference to FIGS. 8-10, the inner sleeve 224 extends between an upper extent 238 and a lower extent 240. In one embodiment, the distance from the upper extent 238 to the lower extent 240 is slightly less than a distance from the upper shoulder 234 to the lower shoulder 236 of the shaft 222. The sleeve 224 extends circumferentially from a first circumferential extent 242 to a second circumferential extent 244. The sleeve 224 further defines a gap 245 between the first circumferential extent 242 and the second circumferential extent 244. The gap 245 extends from the upper extent 238 to the lower extent 240 and is substantially parallel to the longitudinal axis 221 of the shaft 222. The inner sleeve 224 further defines an inner surface 246 and an outer surface 248. The inner sleeve 224 is configured such that the thickness of the sleeve 224 increases between the first circumferential extent 242 and the second circumferential extent 244. That is, the inner sleeve 224 defines a generally wedge-shaped configuration along its circumference.

The outer sleeve 226 is similar to the inner sleeve 224. The outer sleeve 226 extends from an upper extent 250 to a lower extent 252 and from a first circumferential extent 254 to a second circumferential extent 256. The first circumferential extent 254 and the second circumferential extent 256 define a gap 255 which extends longitudinally along the outer sleeve 266. The thickness of the outer sleeve 226 preferably increases from the first circumferential extent 254 to the second circumferential extent 256, providing a generally wedge-shaped configuration. The outer sleeve 226 further defines an inner surface 258 and an outer surface 260.

In some embodiments, the thickness of the first circumferential extent 242 of the inner sleeve 224 and that of the first circumferential extent 254 of the outer sleeve 226 are substantially similar. The thickness of the second circumferential extent 244 of the inner sleeve 224 can be substantially similar to the thickness of the second circumferential extent 256 of the outer sleeve 226. In some embodiments, the rate of increase in thickness between the first and second circumferential extents of the sleeves 224, 226 is substantially similar. That is, the wedge shape defined by the inner sleeve 224 is substantially similar to the wedge shape of the outer sleeve 226. This arrangement enables the fastener 220 to move between a first rotational position corresponding to insertion of the fastener 220 into a work piece and a second rotational position corresponding to secure engagement of the fastener 220 with the work piece with the longitudinal axis 221 remaining in substantially the same location. In one arrangement, at least one of the inner and outer sleeves 224, 226 have a wedge angle selected to provide secure engagement between the fastener 220 and at least one, e.g., a plurality of objects or structures. In one embodiment, at least one of the sleeves 224, 226 have a wedge angle of about 8 degrees or less. In one arrangement, at least one, e.g., both, of the inner and outer sleeves 224, 226 increase in thickness by about 0.3 times the inner diameter thereof or less per radian between the first and second circumferential extents thereof.

The fastener 220 can be configured such that when it is assembled, the inner sleeve 224 resides at least partially in the recess 232. The fastener 220 can be configured such that the outer sleeve 226 is disposed over the inner sleeve 224. In some embodiments that the gap 245 of the sleeve 224 and the gap 255 of the sleeve 226 overlap at least in an arrangement of the fastener 220 that facilitates insertion thereof into a work piece. In some embodiments, when the fastener 220 is assembled, the sleeve 224 is arranged so that the thicker portion thereof adjacent to the circumferential extent 244 is located generally under the circumferential extent 254 of the sleeve 226. The thicker portion of the sleeve 224 can be disposed radially between the circumferential extent 254 of the sleeve 226 and the longitudinal axis 221. In some cases, the fastener 220 is configured such that the thinner portion of the sleeve 224 adjacent to the circumferential extent 242, is generally disposed between the thicker portion of the sleeve 226. When assembled, the sleeves 224, 226 are arranged such that the sleeve 224 increases in thickness in a counterclockwise direction and the sleeve 226 increases in thickness in a clockwise direction as viewed in FIG. 10. In one embodiment, the gaps 245, 255 overlap such that at least a portion of the shaft 222 is exposed therethrough. Also, when assembled, the inner surface 246 of the inner sleeve 224 preferably contacts with the outer surface 230 of the shaft 222 and the inner surface 258 of the outer sleeve 226 preferably contacts with an outer surface 248 of the inner sleeve 224.

In use, the fastener 220 can be inserted into a hole or recess with the inner sleeve 224 and the outer sleeve 226 in the first rotational position, which corresponds to a low profile configuration. The shaft 222 can be rotated thereafter such that it frictionally engages and rotates the inner sleeve 224 relative to the outer sleeve 226. During this rotation engagement, the outer surface 260 of the outer sleeve 226 frictionally engages with a surface located in the hole or recess in the work piece. The outer surface 248 of the inner sleeve 224 can be configured to slide along the inner surface 258 of the outer sleeve 226. That is, the outer sleeve 226 is substantially rotationally secured by frictional engagement within the hole or recess of a work piece and the inner sleeve 224 is rotated relative to the outer sleeve 226 by frictional engagement with the shaft 222. When the inner sleeve 224 rotates relative to the outer sleeve 226, e.g., as a result of clockwise rotation of the shaft 222, a circumferential dimension of or perimeter around the inner sleeve 224 and the outer sleeve 226 and the shaft 222, preferably increases relative to a rotational position corresponding to rotation of the fastener 220 to secure the fastener. This general increase in size of the fastener 220 enhances engagement with the hole or recess in the work piece.

Although the fastener 220 has been shown to use friction to engage the shaft 222 with the sleeve 224, another approach to provide engagement employs a longitudinal rib 228 such as that shown in the fastener 220' of FIG. 10A. The fastener 220' comprises the same general structure as the fastener 220 with the addition of the rib 228 on the outer surface 230'. The rib 228 is configured to rotate the inner sleeve 224 relative to the outer sleeve 226 when the shaft 222' is rotated. When assembled, the rib 228 preferably is located adjacent to the circumferential extent 244 of the inner sleeve 224 and is configured to abut the circumferential extent 244 to push the inner sleeve 224 when the shaft 222' is rotated. Such movement causes the generally thicker portion of the inner sleeve 224 to be moved toward a generally thicker portion of the outer sleeve 226. The outer surface 260 of the outer sleeve 226 can thereby be urged generally away from the longitudinal axis 221 and into frictional engagement with a work piece as described above.

Figure 11:
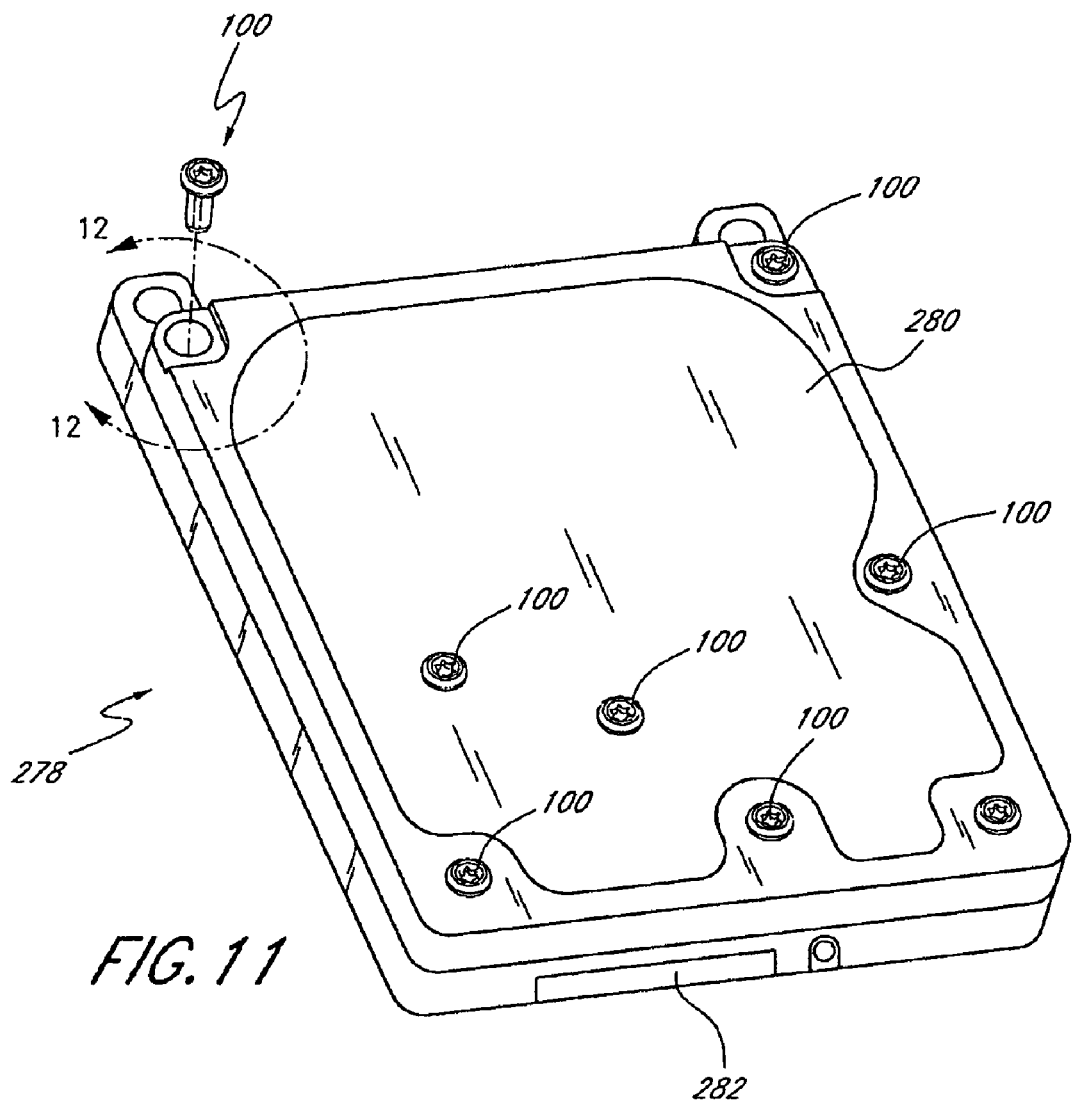
FIG. 11 is an exploded view of a disk drive in which the fastener of FIG. 1 is used to couple a cover with a base.
Figure 12:
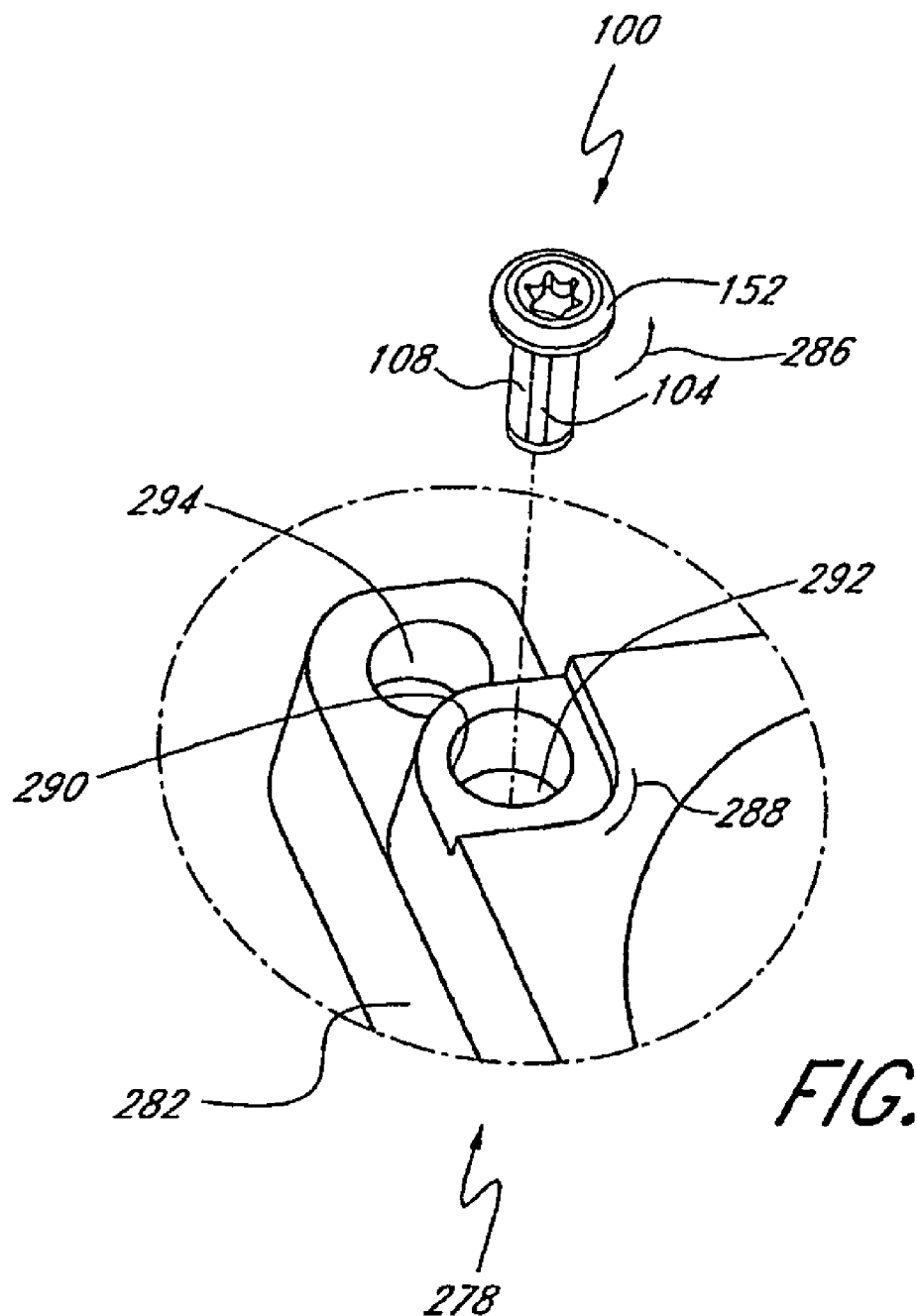
FIG. 12 is an enlarged, exploded view of the disk drive of FIG. 11 illustrating a technique for applying coupling the fastener of FIG. 1.
Figure 13:
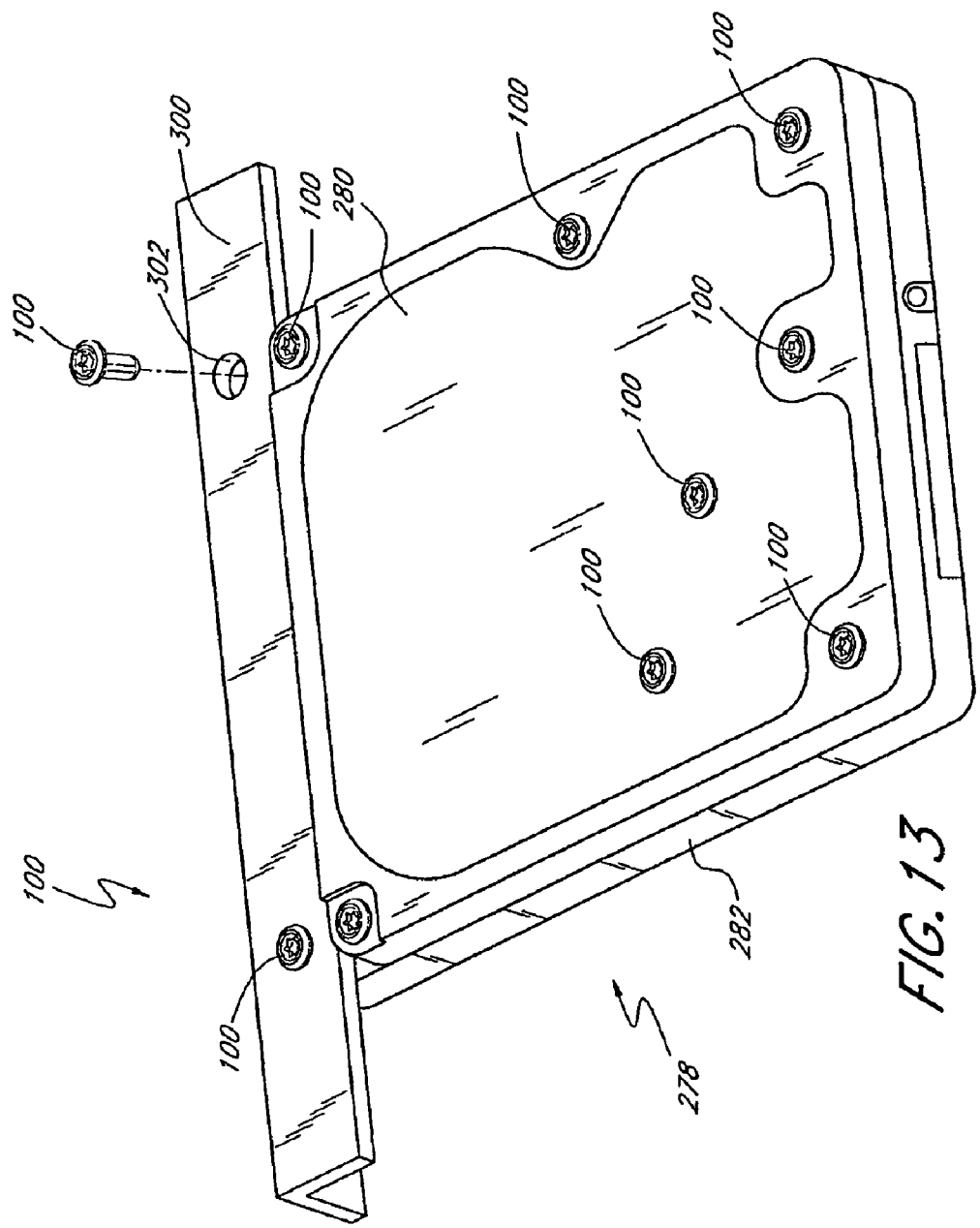
FIG. 13 is perspective view of a disk drive assembly in which a fastener similar to these described herein is used to couple an enclosure of a disk drive to a mounting structure of a user device.

FIGS. 11-13 illustrate some example environments in which the fasteners described above can be used. FIG. 11 shows a disk drive 278 in which the fastener 100 or any other of the fasteners described herein can be used. The disk drive 278 comprises a base 282 and a cover 280. The fasteners 100 can be used to secure the cover 280 to the base 282 of the disk drive 278. FIG. 11 illustrates that a plurality of fasteners, e.g., eight fasteners, can be used to secure the cover 280 to the base 282 of the disk drive 278.

With reference to FIGS. 11 and 12, in one technique an external clamp (not shown) may be used to preload the cover 280 downward against the base 282. The clamp compresses a gasket (not shown) disposed between the base 282 and the cover 280. The fastener 100 can then be inserted through a hole 290 in the cover 280 and into a hole or recess 292 defined by the base 282. The fastener 100 can be rotated in a first direction, e.g., in a counter-clockwise direction as indicated by an arrow 286, so as to facilitate easy insertion of the fastener 100. By rotating the fastener 100 in a counter-clockwise direction, a circumferential distance around the sleeve 108 can be minimized so that the fastener 100 has minimal frictional engagement with the hole 292 in the base 282 during insertion. Once the fastener 100 is inserted through the hole 290 in the cover 280 and into the hole 292 in the base 282, the fastener 100 can be rotated clockwise so as to expand the sleeve 108. As the sleeve 108 expands, the sleeve frictionally engages a surface that at least partially defines the hole 292. The frictional engagement of the sleeve 108 with the hole 292 substantially prevents the fastener 100 from being pulled out of the hole and thus prevents the cover 280 from being pulled off the base 282 in normal use of the disk drive 278.

As discussed above, the fastener 100 can be configured to prevent the cover 280 from lifting away from the base 282, e.g., under the spring-like force of a compressed gasket positioned therebetween. For example, the head portion 152 can be made larger than the hole 290 in the cover 280. Also, as discussed above, ribs can be provided on the fastener 100 to provide some axial force when the fastener is applied.

FIG. 13 illustrates another example environment in which the fasteners described herein, e.g., the fastener 100, can be used. In some applications, an electronic component is mounted within a user device. For example, the disk drive 278 can be mounted in a computer by securing the drive to a mounting structure 300. The mounting structure or member 300 can comprise an elongated rigid member, such as a rail or a flange, that can be secured within a computer. In one application, the fasteners 100 passes through a hole or aperture 302 in the mounting structure 300 and a hole or recess 294 coupled with the disk drive 278, e.g., on the cover or the base. The fastener 100 can then manipulated as described above to cause the fastener to secure the disk drive 278 to the mounting structure 284.

Although the environments shown in FIGS. 11-13 relate to using the fastener 100 with a disk drive, the fasteners described herein can be in many other applications, including applications not limited to computer hardware and electronic components.

The various devices, methods and techniques described above provide a number of examples of ways to carry out the invention. It is to be understood that not necessarily all objectives or advantages described may be achieved in accordance with any particular embodiment described herein. Also, although the invention has been disclosed in the context of certain example embodiments, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments described herein.

What is claimed is:

1. A fastener, comprising:
    a shaft extending along a longitudinal axis, the longitudinal axis passing through a cross-sectional centroid of the shaft; and
    a sleeve wrapped partially around the shaft, the sleeve comprising an inner surface adjacent the shaft, an outer surface, an upper extent, a lower extent, a first circumferential extent, a second circumferential extent, and a gap extending longitudinally from the upper extent to the lower extent and separating the first circumferential extent from the second circumferential extent,
    the sleeve having a first thickness adjacent the first circumferential extent and a second thickness between the second circumferential extent and the first circumferential extent, the first thickness being less than the second thickness;

wherein the sleeve has a first rotational position relative to the shaft and a second rotational position relative to the shaft different from the first rotational position, wherein the longitudinal axis is in substantially the same location in both the first and second rotational positions, and further comprising at least one rib extending about the shaft, wherein the at least one rib comprises a helical rib having a pitch angle of 5 degrees or less.

2. A fastener, comprising:

a shaft extending along a longitudinal axis, the longitudinal axis passing through a cross-sectional centroid of the shaft; and a sleeve wrapped partially around the shaft, the sleeve comprising an inner surface adjacent the shaft, an outer surface, an upper extent, a lower extent, a first circumferential extent, a second circumferential extent, and a gap extending longitudinally from the upper extent to the lower extent and separating the first circumferential extent from the second circumferential extent, the sleeve having a first thickness adjacent the first circumferential extent and a second thickness between the second circumferential extent and the first circumferential extent, the first thickness being less than the second thickness;

wherein the sleeve has a first rotational position relative to the shaft and a second rotational position relative to the shaft different from the first rotational position, wherein the longitudinal axis is in substantially the same location in both the first and second rotational positions, and wherein the sleeve has an angle between the inside surface and the outside surface of about 8 degrees or less, the angle being defined between a tangent to the inside surface and a tangent to the outside surface.

3. A fastener, comprising:

a shaft extending along a longitudinal axis, the longitudinal axis passing through a cross-sectional centroid of the shaft; and a sleeve wrapped partially around the shaft, the sleeve comprising an inner surface adjacent the shaft, an outer surface, an upper extent, a lower extent, a first circumferential extent, a second circumferential extent, and a gap extending longitudinally from the upper extent to the lower extent and separating the first circumferential extent from the second circumferential extent, the sleeve having a first thickness adjacent the first circumferential extent and a second thickness between the second circumferential extent and the first circumferential extent, the first thickness being less than the second thickness;

wherein the sleeve has a first rotational position relative to the shaft and a second rotational position relative to the shaft different from the first rotational position, wherein the longitudinal axis is in substantially the same location in both the first and second rotational positions, and wherein the sleeve comprises an inner diameter and increases in thickness by about 0.3 times the inner diameter or less per radian between the second extent and the first extent.

* * * * *